United States Patent
Brosch

(10) Patent No.: US 10,146,786 B2
(45) Date of Patent: *Dec. 4, 2018

(54) MANAGING DEDUPLICATION IN A DATA STORAGE SYSTEM USING A BLOOMIER FILTER DATA DICTIONARY

(71) Applicant: Dell International L.L.C., Round Rock, TX (US)

(72) Inventor: Ryan W. Brosch, Arden Hills, MN (US)

(73) Assignee: Dell International L.L.C., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,200

(22) Filed: May 8, 2017

(65) Prior Publication Data

US 2017/0242869 A1    Aug. 24, 2017

Related U.S. Application Data

(63) Continuation of application No. 14/564,947, filed on Dec. 9, 2014, now Pat. No. 9,672,216.

(51) Int. Cl.
*G06F 3/06* (2006.01)
*G06F 17/30* (2006.01)
*G06F 12/0864* (2016.01)

(52) U.S. Cl.
CPC ...... *G06F 17/30156* (2013.01); *G06F 3/0608* (2013.01); *G06F 3/0641* (2013.01);
(Continued)

(58) Field of Classification Search
CPC ............................................. G06F 17/30156
See application file for complete search history.

(56) References Cited

U.S. PATENT DOCUMENTS 7,613,945 B2 *  11/2009  Soran ................... G06F 3/0608
                                                      714/5.11
7,864,083 B2 *   1/2011  Mahoney ............ H03M 7/4006
                                                       341/51
(Continued)

OTHER PUBLICATIONS

Chazelle, Bernard, et al. "The Bloomier filter: an efficient data structure for static support lookup tables." Proceedings of the fifteenth annual ACM-SIAM symposium on Discrete algorithms. Society for Industrial and Applied Mathematics, 2004. (Year: 2004).*
(Continued)

*Primary Examiner* — William Spieler
(74) *Attorney, Agent, or Firm* — Winthrop & Weinstine, P.A.

(57) ABSTRACT

A method including maintaining a library having a plurality of storage tablets, each storage tablet storing a plurality of hash-to-storage mappings, each mapping a hash value to a storage location at which a block of data is stored, the block of data translating to the hash value pursuant to a hashing algorithm. The method also including upon receipt and/or determination of a new hash for incoming data pursuant to the hashing algorithm: a) querying a tablet cache for a hash-to-storage mapping having the new hash, the tablet cache comprising a subset of storage tablets copied from the library; and/or b) querying a secondary index for a hash-to-storage tablet mapping having the new hash, the secondary index including a plurality of filters, each filter mapping each of a plurality of key hashes to a storage tablet of the library storing that particular key hash in a hash-to-storage mapping.

18 Claims, 2 Drawing Sheets

(52) U.S. Cl.
CPC ........ *G06F 3/0679* (2013.01); *G06F 12/0864* (2013.01); *G06F 17/3048* (2013.01); *G06F 17/30097* (2013.01); *G06F 17/30483* (2013.01); *G06F 2212/60* (2013.01)

(56) References Cited

U.S. PATENT DOCUMENTS

| | | | | |
|---|---|---|---|---|
| 7,881,544 B2* | 2/2011 | Bashyam | H03M 7/40 | 382/232 |
| 7,885,988 B2* | 2/2011 | Bashyam | H03M 7/30 | 707/812 |
| 7,936,932 B2* | 5/2011 | Bashyam | G06T 9/002 | 382/232 |
| 7,961,959 B2* | 6/2011 | Bashyam | G06T 9/002 | 382/224 |
| 7,961,960 B2* | 6/2011 | Bashyam | G06F 17/30153 | 382/232 |
| 7,970,216 B2* | 6/2011 | Bashyam | H04N 19/13 | 382/232 |
| 7,974,478 B2* | 7/2011 | Bashyam | G06T 9/004 | 382/232 |
| 8,200,641 B2* | 6/2012 | Jayaraman | G06F 17/30156 | 341/51 |
| 8,219,534 B2* | 7/2012 | Rao | G06F 17/30233 | 707/693 |
| 8,224,831 B2* | 7/2012 | Rao | G06F 17/30153 | 707/758 |
| 8,386,443 B2* | 2/2013 | Brueggemann | G06F 17/30156 | 707/609 |
| 8,396,843 B2* | 3/2013 | Jayaraman | G06F 17/30088 | 707/692 |
| 8,396,899 B2* | 3/2013 | Jayaraman | G06F 17/30159 | 707/728 |
| 8,423,520 B2* | 4/2013 | Rao | G06F 17/3015 | 707/692 |
| 8,468,292 B2* | 6/2013 | Aszmann | G06F 3/0608 | 711/103 |
| 8,510,275 B2* | 8/2013 | Wilson | G06F 17/30156 | 707/610 |
| 8,516,002 B2* | 8/2013 | Rao | H04L 67/06 | 707/603 |
| 8,521,705 B2* | 8/2013 | Jayaraman | G06F 3/0641 | 707/687 |
| 8,543,555 B2* | 9/2013 | Jayaraman | G06F 17/30156 | 341/51 |
| 8,612,401 B2* | 12/2013 | Dinkar | G06F 17/30156 | 707/693 |
| 8,655,898 B2* | 2/2014 | Rao | G06F 17/30153 | 707/692 |
| 8,671,116 B2* | 3/2014 | Jayaraman | G06F 17/30159 | 707/728 |
| 8,694,466 B2* | 4/2014 | Rao | G06F 17/30038 | 382/232 |
| 8,762,349 B2* | 6/2014 | Jayaraman | G06F 17/30159 | 707/692 |
| 8,825,985 B2* | 9/2014 | Jayaraman | H04L 67/06 | 711/154 |
| 8,849,773 B2* | 9/2014 | Dinkar | G06F 17/30156 | 707/692 |
| 8,849,774 B2* | 9/2014 | Dinkar | G06F 17/30156 | 707/693 |
| 8,862,559 B2* | 10/2014 | Jayaraman | G06F 17/30156 | 707/693 |
| 8,892,528 B2* | 11/2014 | Rao | G06F 3/0641 | 707/687 |
| 8,965,852 B2* | 2/2015 | Jayaraman | G06F 17/30156 | 707/664 |
| 9,020,909 B2* | 4/2015 | Jayaraman | G06F 17/30088 | 707/692 |
| 2012/0084270 A1* | 4/2012 | Jayaraman | G06F 17/30156 | 707/692 |
| 2012/0084527 A1* | 4/2012 | Jayaraman | G06F 17/30156 | 711/165 |
| 2012/0124285 A1* | 5/2012 | Soran | G06F 3/0608 | 711/114 |
| 2012/0166725 A1* | 6/2012 | Soran | G06F 3/0608 | 711/114 |
| 2013/0080404 A1* | 3/2013 | Smith | G06F 17/30159 | 707/692 |
| 2013/0080405 A1* | 3/2013 | Smith | G06F 17/30159 | 707/692 |
| 2013/0138607 A1* | 5/2013 | Bashyam | G06F 17/30174 | 707/610 |
| 2013/0238570 A1* | 9/2013 | Rao | G06F 17/30156 | 707/692 |
| 2013/0246372 A1* | 9/2013 | Rao | G06F 17/3015 | 707/692 |
| 2013/0254458 A1* | 9/2013 | Pittelko | G06F 12/02 | 711/103 |
| 2013/0297572 A1* | 11/2013 | Wilson | G06F 17/30156 | 707/692 |
| 2014/0025644 A1* | 1/2014 | Taylor | G06F 17/30129 | 707/690 |
| 2014/0195748 A1* | 7/2014 | Bashyam | G06F 12/121 | 711/159 |
| 2014/0214760 A1* | 7/2014 | Bashyam | G06F 17/30575 | 707/613 |
| 2014/0222769 A1* | 8/2014 | Rao | G06F 17/30038 | 707/692 |
| 2014/0250281 A1* | 9/2014 | Rao | G06F 12/0223 | 711/156 |
| 2014/0258237 A1* | 9/2014 | Dinkar | G06F 11/1469 | 707/645 |
| 2014/0258244 A1* | 9/2014 | Rao | G06F 17/30159 | 707/692 |
| 2014/0310251 A1* | 10/2014 | Jayaraman | G06F 17/30159 | 707/692 |
| 2015/0012698 A1* | 1/2015 | Bolla | G06F 12/0866 | 711/113 |
| 2015/0019515 A1* | 1/2015 | Dinkar | G06F 17/30156 | 707/693 |
| 2015/0026139 A1* | 1/2015 | Jayaraman | G06F 17/30156 | 707/692 |
| 2015/0032978 A1* | 1/2015 | Bashyam | G06F 17/30159 | 711/162 |
| 2015/0039571 A1* | 2/2015 | Rao | G06F 3/0641 | 707/692 |

OTHER PUBLICATIONS

Tsuchiya, Yoshihiro, and Takashi Watanabe. "Dblk: Deduplication for primary block storage." Mass Storage Systems and Technologies (MSST), 2011 IEEE 27th Symposium on. IEEE, 2011. (Year: 2011).*
U.S. Appl. No. 14/453,121, filed Aug. 6, 2014, Tripathy et al.
U.S. Appl. No. 14/453,150, filed Aug. 6, 2014, Tripathy et al.
U.S. Appl. No. 14/453,158, filed Aug. 6, 2014, Tripathy et al.
U.S. Appl. No. 14/453,165, filed Aug. 6, 2014, Tripathy et al.
U.S. Appl. No. 14/453,173, filed Aug. 6, 2014, Tripathy et al.
Albireo SANblox™: Microsoft® Windows® Server Solution Profile, 2015, downloaded from URL:<http://permabit.com/products-overview/albireo-sanblox/> on Nov. 11, 2015 (21 pages).
Albireo SANblox™: Vmware® Solution Profile, 2015, downloaded from URL:<http://permabit.com/products-overview/albireo-sanblox/> on Nov. 11, 2015 (26 pages).
Chazelle, Bernard et al. "The Bloomier Filter: An Efficient Data Structure for Static Support Lookup Tables", SODA '04 Proceedings of the Fifteenth Annual ACM-SIAM Symposium on Discrete Algorithms, Jan. 11, 2004 (pp. 30-39).
Garrett, Brian. "Lab Validation Report: Permabit Albireo", Aug. 2011, Enterprise Strategy Group (22 pages).
Permabit Albireo SANblox™ Data Sheet, 2015, downloaded from URL:<http://permabit.com/products-overview/albireo-sanblox/> on Nov. 11, 2015 (2 pages).

(56) References Cited

OTHER PUBLICATIONS

Permabit Albireo SANblox™ FAQ, downloaded from URL:<http://permabit.com/products-overview/albireo-sanblox/> on Nov. 11, 2015 (5 pages).
Permabit Albireo SDK Data Sheet, 2015, downloaded from URL:<http://permabit.com/products-overview/albireo-software-development-kit-sdk/> on Nov. 11, 2015 (2 pages).
Permabit Albireo SDK Real-World Results Data Sheet, 2015, downloaded from URL:<http://permabit.com/products-overview/albireo-software-development-kit-sdk/> on Nov. 11, 2015 (2 pages).
Permabit Albireo VDO Data Sheet, 2015, downloaded from URL:<http://permabit.com/products-overview/albireo-virtual-data-optimizer-vdo/> on Nov. 11, 2015 (2 pages).
Permabit HIOPS Compression™ Data Sheet, 2015, downloaded from URL:<http://permabit.com/products-overview/albireo-virtual-data-optimizer-vdo/> on Nov. 11, 2015 (2 pages).
Peters, Mark et al. "Permabit Albireo: Primary Data Deduplication That's Primarily About Massive Business Value", Aug. 2011, Enterprise Strategy Group (13 pages).
Vikraman, Rashmi et al. "A study on various data de-duplicaiton systems". International Journal of Computer Applications 94.4 (2014).

* cited by examiner

MANAGING DEDUPLICATION IN A DATA STORAGE SYSTEM USING A BLOOMIER FILTER DATA DICTIONARY

CROSS-REFERENCE TO RELATED APPLICATIONS

This application is a continuation of U.S. patent application Ser. No. 14/564,947, titled "Managing Deduplication in a Data Storage System Using a Bloomier Filter Data Dictionary," filed Dec. 9, 2014, which is hereby incorporated by reference herein in its entirety.

FIELD OF THE INVENTION

The present disclosure relates generally to data deduplication in a data storage system. Particularly, the present disclosure relates to improved data deduplication utilizing a data dictionary with "dense" storage tablets, comprising hashes and corresponding mapped data address locations, and a secondary index. The secondary index may include a plurality of Bloomier filters.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Present information handling systems often take advantage of various data storage technologies, such as a redundant array of independent disks (RAID), which is a storage technology combining multiple disk or other drives into a logical storage unit. The use of RAID technology can improve data redundancy and performance. Data may be distributed across the drives in several ways, referred to as RAID levels. The RAID level utilized may depend on the specific level of redundancy and performance required. Each level provides a different balance between reliability, availability, performance, and capacity of the information handling system.

An increasing problem with such information handling systems, and particularly those employing more complex storage technologies, is the wasted storage space taken up by duplicate data. Accordingly, procedures for data deduplication (also referred to herein simply as "deduplication") have become increasingly desirable and/or important. Data deduplication is a technique where files, or other units of stored data, with identical contents are first identified, and then only one copy of the identical contents, the single-instance copy, is kept in the physical storage while the storage space for the remaining identical content can be reclaimed and reused. Thus, deduplication achieves what is called single-instance storage, where only the single-instance copy is stored in the physical storage, along with one or more references to the unique single-instance copy, resulting in more efficient use of the physical storage space.

As may be appreciated, therefore, deduplication may reduce the required storage capacity since less duplicate data is stored. Moreover, deduplication can lead to a "domino effect" of efficiency, reducing for example capital, administrative, and facility costs, as well as, for example, reducing energy use, cooling needs, and overall carbon footprint of the system. Also, less hardware may need to be purchased, recycled, and/or replaced, further lowering costs.

On the other hand, however, deduplication is conventionally a random access memory (RAM) limited feature and requires CPU time that could otherwise be utilized for other processing tasks, such as input/output operations. Thus, inefficient deduplication procedures could, for example, decrease the input/output operations per second (IOPS). Thus, there remains a need for further improvement, and incorporation of additional efficiencies, to deduplication procedures for an information handling system.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method for facilitating data deduplication in a data storage system. The method may include maintaining an electronic data library having a plurality of storage tablets, each storage tablet electronically storing a plurality of hash-to-storage mappings, each mapping a hash value to a storage address location in a data storage subsystem at which a block of data is stored, the block of data translating to the hash value pursuant to a hashing algorithm. The method may also include maintaining a secondary index having a plurality of filters, each filter electronically mapping each of a plurality of hashes to a storage tablet of the data library storing that particular hash in a hash-to-storage mapping. In some embodiments, the data library may be maintained in non-volatile memory. In further embodiments, the plurality of storage tablets in the data library may be maintained as read-only. In additional or alternative embodiments, the filters of the secondary index may be maintained in RAM. In certain embodiments, each of the filters in the secondary index may be a Bloomier filter.

The present disclosure, in another embodiment, relates to an information handling system. The information handling system may include an electronic data library having a plurality of storage tablets, each storage tablet electronically storing a plurality of hash-to-storage mappings, each mapping a hash value to a storage address location in the information handling system at which a block of data is stored, the block of data translating to the hash value pursuant to a hashing algorithm. The information handling system may additionally include a secondary index comprising a plurality of filters, each filter electronically mapping each of a plurality of hashes to a storage tablet of the data library storing that particular hash in a hash-to-storage mapping. In some embodiments, the data library may be stored in non-volatile memory, and in additional or alternative embodiments, the plurality of filters of the secondary index may be stored in RAM. For some embodiments, the hash-to-storage mappings for each storage tablet may be sorted by hash value. In some embodiments, the hashing algorithm used may be a collision-resistant hash function, while in other embodiments, the hashing algorithm may be a non-collision free hash function. For some embodiments, each of the plurality of filters of the secondary index may be a Bloomier filter, and in further embodiments, the plurality of filters may be categorized into layers, with a plurality of filters in each layer. In still further embodiments, the layers form a cascade of filter layers with, for each layer above a bottom layer, a filter from that layer is formed from a combination of the filters from a lower layer. In certain embodiments, the data library may be a fixed size, circular log of storage tablets, such that when it is at capacity, the oldest storage tablet is overwritten. Still further, one or more of the storage tablets of the data library may be write stream specific, storing only hash-to-storage mappings corresponding to blocks of data from the same write stream. In some embodiments, the information handling system may additionally comprise a tablet cache stored in RAM, the tablet cache storing a subset of storage tablets copied from the data library. The tablet cache may comprise a storage tablet copied from the data library that has been most recently accessed for a hash-to-storage mapping. In some embodiments, the plurality of hashes mapped by the filters of the secondary index may be a pre-defined subset of hashes stored in the storage tablets of the data library.

The present disclosure, in yet another embodiment, relates to a method for data deduplication in a data storage system. The method may include maintaining an electronic data library having a plurality of storage tablets, each storage tablet electronically storing a plurality of hash-to-storage mappings, each mapping a hash value to a storage address location in the data storage system at which a block of data is stored, the block of data translating to the hash value pursuant to a hashing algorithm. The method may also include upon receipt and/or determination of a new hash for incoming data pursuant to the hashing algorithm: a) querying a tablet cache for a hash-to-storage mapping having the new hash, the tablet cache comprising a subset of storage tablets copied from the data library; and/or b) querying a secondary index for a hash-to-storage tablet mapping having the new hash, the secondary index including a plurality of filters, each filter electronically mapping each of a plurality of key hashes to a storage tablet of the data library storing that particular key hash in a hash-to-storage mapping.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
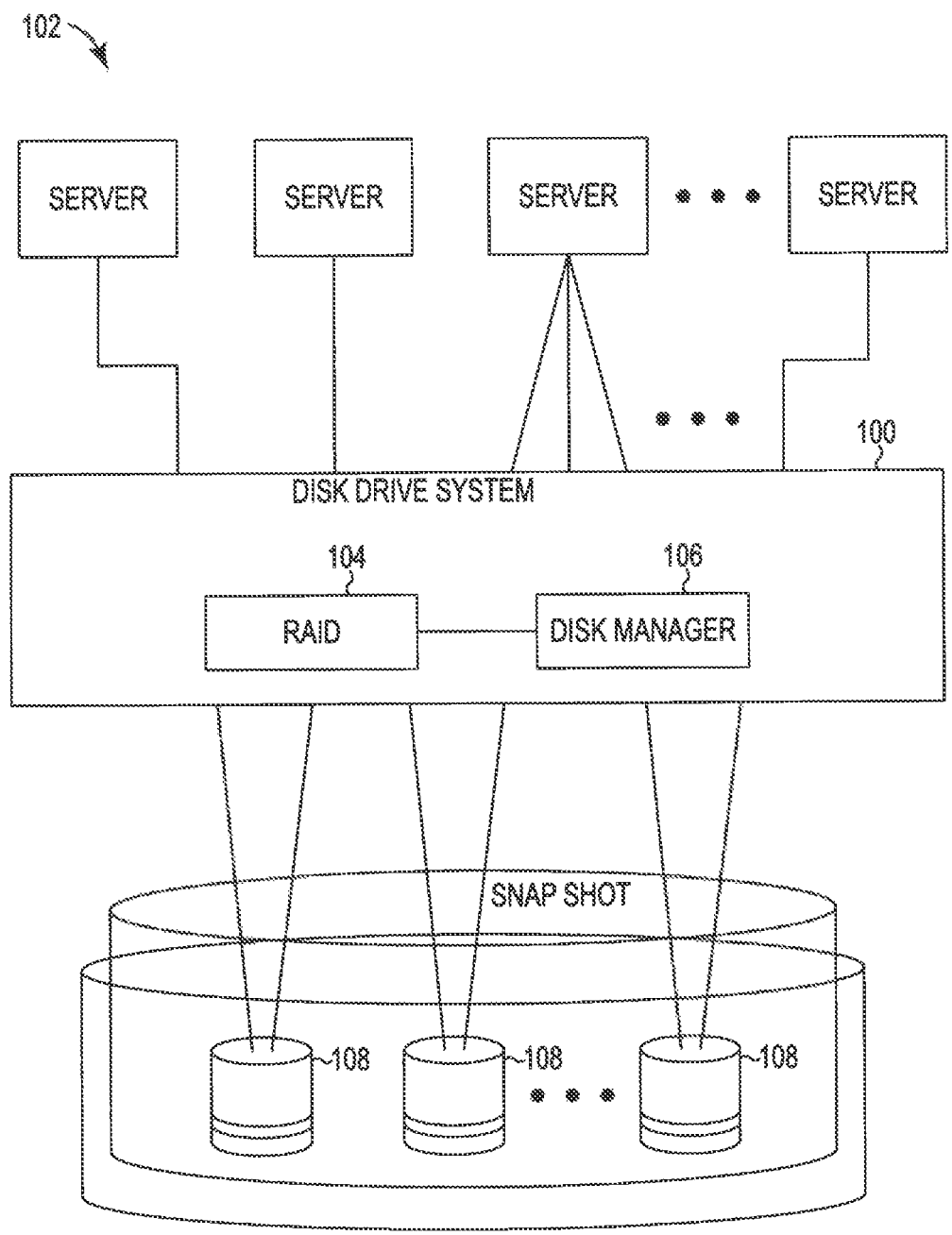
FIG. 1 is a schematic of an information handling system, in the form of a data storage system, suitable for the various embodiments of I/O handling of the present disclosure.

The present disclosure relates generally to novel and advantageous data deduplication in a data storage system or other information handling system. Particularly, the present disclosure relates to novel and advantageous data deduplication utilizing a data dictionary with "dense" storage tablets, comprising hashes and corresponding mapped data address locations, and a secondary index. The secondary index may include a plurality of Bloomier filters.

For purposes of this disclosure, any system or information handling system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a minicomputer, mainframe computer, personal computer (e.g., desktop or laptop), tablet computer, mobile device (e.g., personal digital assistant (PDA) or smart phone) or other hand-held computing device, server (e.g., blade server or rack server), a network storage device, or any other suitable device or combination of devices, and may vary in size, shape, performance, functionality, and price. A system may include volatile memory (e.g., RAM), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of a system may include one or more disk drives or one or more mass storage devices, one or more network ports for communicating with external devices as well as various input and output (I/O) devices, such as a keyboard, a mouse, touchscreen, and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, Fibre Channel, and IEEE 1394. A system may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input/output device for communicating with one or more users or for entering information into the system. These and other devices for interacting with the system may be connected to the system through one or more I/O device interfaces via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

A system may also include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, etc.) using any of a variety of commercially available bus architectures.

While the various embodiments are not limited to any particular type of information handling system, the systems and methods of the present disclosure may be particularly useful in the context of a storage center comprising mass storage devices, such as but not limited to disk drive and solid state drive systems, or virtual disk drive systems, such as that described in U.S. Pat. No. 7,613,945, titled "Virtual Disk Drive System and Method," issued Nov. 3, 2009, U.S. Pat. No. 8,468,292, titled "Solid State Drive Data Storage System and Method," issued Jun. 18, 2013, U.S. Publ. No. 2012/0124285, titled "Virtual Disk Drive System and Method with Cloud-Based Storage Media," filed Aug. 12, 2011, U.S. Publ. No. 2012/0166725, titled "Virtual Disk Drive System and Method with Deduplication," filed Aug. 12, 2011, and U.S. Publ. No. 2013/0254458, titled "Single-Level Cell and Multi-Level Cell Hybrid Solid State Drive," filed Mar. 26, 2012, each of which is incorporated by reference herein in its entirety. Such data storage systems may allow the efficient storage of data by, for example, dynamically allocating user data across a page pool of storage, or a matrix of drive storage blocks, and a plurality of drives based on, for example, RAID-to-disk mapping. In general, dynamic allocation presents a virtual disk or storage device or volume to user servers. To the server, the volume acts the same as conventional storage, such as a disk drive, yet provides a storage abstraction of multiple storage devices, such as RAID devices, to create a dynamically sizeable storage device. Data progression may be utilized in such disk drive systems to move data gradually to storage space of appropriate overall cost for the data, depending on, for example but not limited to, the data type or access patterns for the data. In general, data progression may determine the cost of storage in the drive system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such drive systems may protect data from, for example, system failures or virus attacks by automatically generating and storing snapshots or point-in-time copies of the system or matrix of drive storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

FIG. 1 illustrates one embodiment of a disk drive or data storage system 100 in an information handling system environment 102, such as that disclosed in U.S. Pat. Nos. 7,613,945, 8,468,292, U.S. Publ. No. 2012/0124285, U.S. Publ. No. 2012/0166725, and U.S. Publ. No. 2013/0254458, and suitable with the various embodiments of the present disclosure. As shown in FIG. 1, the disk drive system 100 may include a data storage subsystem 104, which may include, but is not limited to, a RAID or JBOD subsystem, as will be appreciated by those skilled in the art, and a disk or drive manager 106 having at least one disk storage system controller. The data storage subsystem 104 and disk/drive manager 106 can dynamically allocate data across drive space of a plurality of disk drives or other suitable storage devices 108, such as but not limited to optical drives, solid state drives, tape drives, etc., based on, for example, RAID-to-disk mapping or other storage mapping technique. The data storage subsystem 104 may include data storage devices distributed across one or more data sites at one or more physical locations, which may be network connected. Any of the data sites may include original and/or replicated data (e.g., data replicated from any of the other data sites) and data may be exchanged between the data sites as desired.

In the various embodiments of the present disclosure, one or more programs or applications, such as a web browser and/or other executable applications, may be stored in one or more of the system data storage devices. Generally, programs may include routines, methods, data structures, other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using any one or more of the input and output devices described above.

A system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), a hotspot, a global communications network, such as the Internet, and so on. The system may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted, or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, RAM, read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by hardware and/or computer-executable program code portions. Computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

As stated above, an increasing problem with information handling systems, and particularly those employing more complex storage technologies, is the wasted storage space taken up by duplicate data. Accordingly, procedures for data deduplication have become increasingly desirable and/or important.

In some conventional systems, deduplication may generally operate by translating, through use of a hashing algorithm, relatively large sections of data, such as but not limited to four (4) kilobytes or larger sections, into smaller corresponding representations of the data, such as but not limited to thirty-two (32) or sixty-four (64) bytes, often referred to as hashes. The hashes may be maintained in an indexing structure, referred to herein as a "data dictionary" or simply "dictionary," stored in RAM and which may map each hash to a location where the corresponding larger section of data is stored. When new user data is received by the system, it is translated into a hash utilizing the hashing algorithm, which is then looked up in, or otherwise compared to the hashes maintained in, the dictionary. In some embodiments, if the hash already exists in the dictionary, it serves as an indicator that the new user data is duplicative of already stored data. More reliably, however, in other embodiments, if the hash already exists in the dictionary and (a) the hash function is a suitably collision-resistant cryptographic hash function (or is otherwise very reliable) and/or (b) a read/compare of the data at the mapped address corresponding to the hash against the incoming new user data reveals they are identical, then it serves as a good indicator that the new user data is duplicative of the data at the mapped address, and the new user data does not need to be stored. Instead a second reference to the already existing data at the mapped address corresponding to the hash can simply be created. Creating a second reference to the already existing data permits the system to avoid writing duplicates and effectively store more data in the same space.

However, as will be appreciated from the foregoing, deduplication is typically limited by available RAM for the dictionary and can require CPU time that could otherwise be utilized for other processing tasks, such as input/output operations. Thus, there remains a need for further improvement, and incorporation of additional efficiencies, to deduplication procedures for an information handling system.

Accordingly, the present disclosure improves on conventional deduplication procedures and systems for use with a data storage system or other information handling system, such as but not limited to the type of data storage systems described in U.S. Pat. Nos. 7,613,945, 8,468,292, and U.S. patent application Ser. No. 13/429,511 by, among other things, abstractly increasing the density of information stored in the RAM for deduplication purposes through use of "dense" storage tablets and a secondary index. The present disclosure additionally improves on conventional deduplication procedures by permitting less collision-resistant hashing algorithms, achieving relatively fast detection of unique hash values, while nonetheless retaining quality identification of duplicative data.

Figure 2:
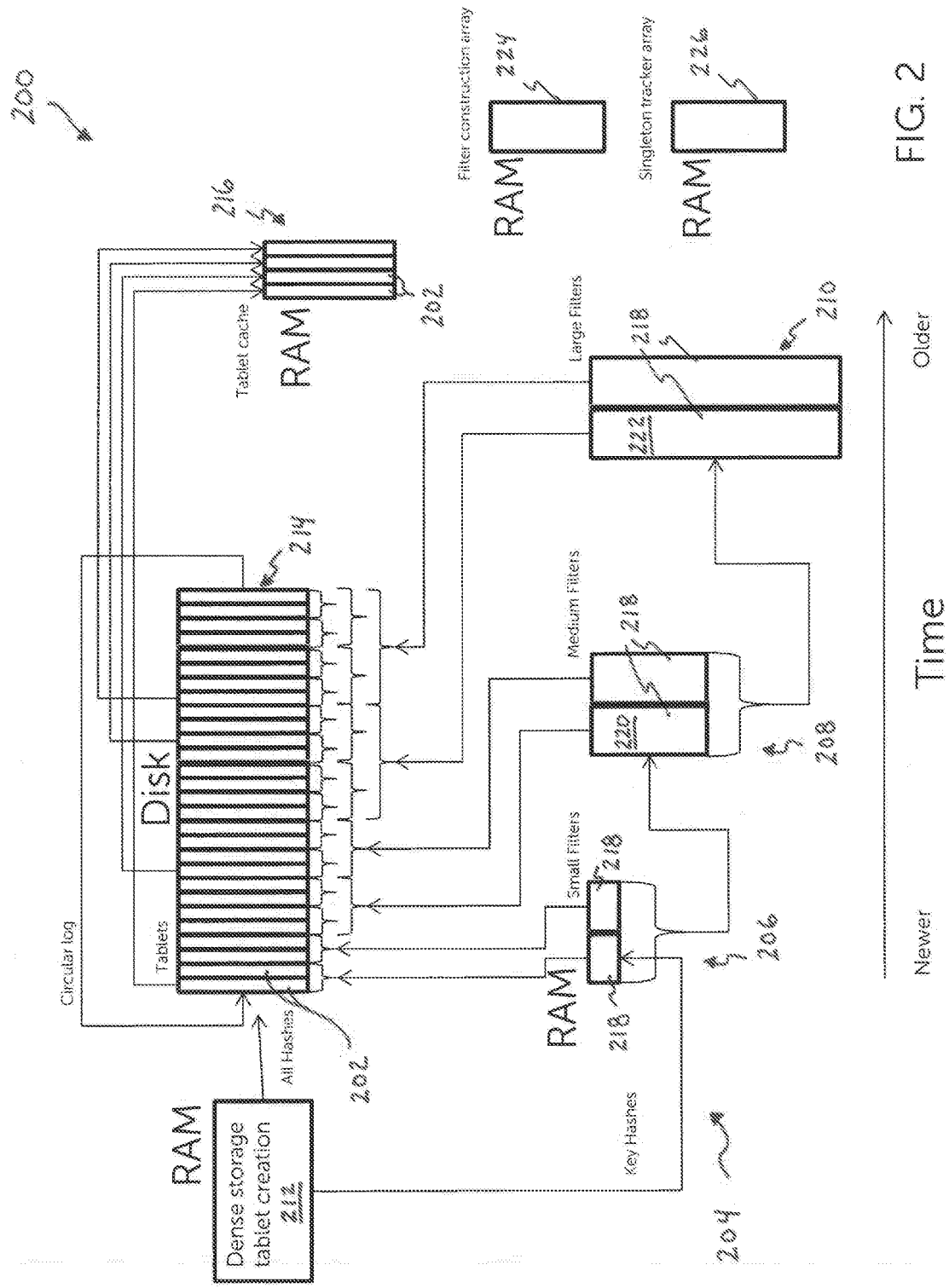
FIG. 2 is a schematic diagram of a data dictionary in an information handling system according to an embodiment of the present disclosure.

More specifically, with respect to FIG. 2, a system according to the various embodiments of the present disclosure may generally comprise a data dictionary 200 having a plurality of "dense" storage tablets 202 and a secondary index 204 for indexing the storage tablets. As will be described in further detail below, each storage tablet 202 may contain a plurality of hashes and corresponding mapped data storage address locations ("hash-to-storage mappings"), identifying for each hash the data storage location storing the user data that hashed down to that particular hash value. As will also be described in further detail below, the secondary index 204 may comprise two or more layers 206, 208, 210 of Bloomier filters.

Dense Storage Tablets

As described above, when new user data is received by the system, it is translated into a hash utilizing a hashing algorithm. In embodiments of the present disclosure, hashing and hash indexing may be hash function agnostic. That is, the hashing method utilized in the various embodiments of the present disclosure may be a cryptographic, collision-resistant hash function, such as but not limited to, SHA-256, or a relatively faster non-collision free hash function, such as but not limited to, Murmur. More generally, any suitable known or later-developed, hashing algorithm can be used in the various embodiments of the present disclosure without limitation.

At any rate, these new hashes may be received (or in come embodiments translated or determined) by the dictionary 200, and through a dense storage tablet creation module 212, which may be executed in system RAM, they may be placed into a "dense" storage tablet 202, which in some embodiments, is also temporarily maintained in system RAM. As described above, each storage tablet 202 may contain a plurality of hashes and corresponding mapped data storage address locations, identifying for each hash the data storage location storing the user data that hashed down to that particular hash value. The hashes of each storage tablet 202 may be sorted by hash value, such as by increasing or decreasing hash values. In one embodiment, each storage tablet 202 can be a fixed size, i.e., storing a fixed number of hash-to-storage mappings. Of course, in other embodiments, storage tablets 202 need not be of fixed size, and instead any given storage tablet could be created of any suitable size, as desired or needed.

In one embodiment, when a storage tablet 202 in the dense storage tablet creation module 212 has been filled, the tablet may be written to a non-volatile storage tablet library 214, such as but not limited to a hard disk drive, flash drive or other solid state device, a plurality of storage devices, a data storage subsystem, such as a JBOD or RAID subsystem or the like, or any combination of such storage devices. In this regard, the storage tablet 202 can be moved off of relatively more expensive volatile memory resources. However, in other embodiments, a storage tablet 202 may be moved from system RAM to non-volatile storage at any other suitable time, including prior to being completely filled. In still other embodiments, the storage tablet 202 need not be moved to non-volatile storage, and instead may remain in a tablet library on system RAM or moved to other volatile storage. In such embodiments, though, advantages of maintaining the tablet library on relatively less expensive non-volatile storage may be minimized or lost. In one embodiment, once a storage tablet 202 is full and moved to non-volatile storage, or otherwise moved from system RAM or the dense storage tablet creation module 212, the storage tablet may be protected as read-only, so that it is not modifiable. In other embodiments, however, the storage tablets 202 may remain modifiable, if so desired.

In one embodiment, the tablet library 214 may be of fixed size, holding a predetermined number of storage tablets 202. Of course, in other embodiments, the tablet library 214 may be dynamically expanded or reduced in size, as desired or needed. The size of the tablet library 214 shown in FIG. 2 is for illustration purposes only, and is not intended to be limiting on the number of storage tablets 202 maintained by the tablet library. In one embodiment, the tablet library 214 may be a circular log of storage tablets 202 in that storage tablets may be written to the tablet library in a log fashion, such that, when the tablet library is full, the oldest storage tablet is automatically overwritten by the newest storage tablet, incoming from the dense storage tablet creation module 212. In this regard, in some embodiments, storage tablets 202 may each contain write time-stamp information, identifying when the storage tablet was written to the tablet library 214 or other suitable moment in time by which storage tablets may be compared for relative length of existence.

In some embodiments, hashes may be associated with a write stream indicator, indicating from which write stream, such as which user or host device, the new user data corresponding to those hashes was received. This may be referred to herein as write stream categorization; although the name is not intended to be limiting. Associating the hashes with a write stream indicator allows the dictionary 200 to correlate specific hashes with a specific write stream. In one embodiment, the dictionary 200, or more particularly, the dense storage tablet creation module 212, may store hashes from each write stream into stream-specific storage tablets 202.

In some embodiments, a dense storage tablet cache 216, typically in volatile storage, such as system RAM, may be provided for maintaining a subset of storage tablets 202 from the tablet library 214. In one embodiment, the tablet cache 216 may comprise one or more of the most recently accessed or otherwise utilized storage tablets 202, which can include, for example, storage tablets that were most recently created by the dense storage tablet creation module 212 due to new hash additions as well as storage tablets accessed and brought into RAM memory by hits through the secondary index 204. In one embodiment, the tablet cache 216 may be of fixed size, caching a predetermined number of storage tablets 202. Of course, in other embodiments, the tablet cache 216 may be dynamically expanded or reduced in size, as desired or needed. The size of the tablet cache 216 shown in FIG. 2 is for illustration purposes only, and is not intended to be limiting on the number of storage tablets 202 maintained by the tablet cache. Similar to the tablet library 214, when the tablet cache 216 is full, the oldest storage tablet 202 in the tablet cache may be automatically overwritten by the most recent incoming cached storage tablet (if not already also in the tablet cache).

Secondary Index

As indicated above, the secondary index 204 may comprise two or more layers 206, 208, 210 of filters 218. In one embodiment, the filter layers 206, 208, 210 may comprise Bloomier filters. However, other filters now known or later developed could be used in place of Bloomier filters. A Bloomier filter is a probabilistic data structure which relates an input key to a value in the range with some false positive rate. The construction of and query process for Bloomier filters, as well as false positive rate calculations, are available in the academic paper Bernard Chazelle et al., *The Bloomier Filter: An Efficient Data Structure for Static Support Lookup Tables*, in SODA '04 PROCEEDINGS OF THE FIFTEENTH ANNUAL ACM-SIAM SYMPOSIUM ON DISCRETE ALGORITHMS, 30-39, Jan. 11, 2004, the contents of which are hereby incorporated herein by reference in their entirety. While illustrated in FIG. 2 as having three layers of filters for ease of illustration, the secondary index 204 is not so limited, and instead may have any suitable number of layers of filters 218 as desired, which may often be limited by the storage capacity, processing power, and/or other specifications (mechanical or administrative) of the system.

In the context of the present application, a "key" hash may be the input key to the filters 218 and the range |R| to which the input key is mapped may be an index to a storage tablet 202 maintained in the tablet library 214. That is, each filter 218 may map an input hash to an index to a storage tablet 202 maintained in the tablet library 214 ("key hash-to-tablet index mapping"). In one embodiment, key hashes may be a pre-determined or pre-designated subset of the new hashes received by the dictionary 200. For example, in one embodiment, key hashes may be identified as every $n^{th}$ new hash received by the dictionary 200, where "n" is an integer. For example, a key hash could be every $2^{nth}$ hash received by the dictionary 200, such as but not limited to, every $4^{th}$, $8^{th}$, or $16^{th}$ hash received by the dictionary. In some embodiments, a key hash may be a hash value where some fixed number of top or bottom bits of the hash are zero.

For ease of explanation only, we may identify three types of layers: bottom, middle, and top. Where layers 0 to N (N being an integer) are used, we may denote layer 0 as a bottom layer, layers 1 to N−1 as middle layers, and layer N as the top layer. Of course, any other designation of the layers could be used, and the nomenclature used herein is not intended to be limiting. In FIG. 2, again for ease of explanation, layer 206 may be designated a bottom layer, layer 208 may be designated a middle layer, and layer 210 may be designated a top layer. In one embodiment, as illustrated in FIG. 2, each of the filters 218 of the filter layers 206, 208, 210 may be designated to index to a specified number of storage tablets 202 in the tablet library 214; this specified number of storage tablets 202 may be based on or relate to how often a key hash is identified according to the pre-determined or pre-designated algorithm discussed above. In one embodiment, the filters in a bottom layer, such as the filters 218 of bottom layer 206, may be designated to index a fixed number, X, of storage tablets 202 in the tablet library 214. The filters in a first middle layer, such as the filters 218 of middle layer 208, may be designated to index a larger fixed number, Y, (i.e., Y>X) of storage tablets in the tablet library 214. As such, the filters 218 of middle layer 208 may be larger in capacity than those of bottom layer 206 in order to hold more key hash-to-tablet index mappings. The filters of each subsequent middle layer may likewise increase in size, with the size of the filters in each subsequent middle layer of filters being larger in capacity than those of the previous middle layer. The filters in a top layer, such as the filters 218 of top layer 210, may be designated to index an even larger fixed number, Z, of storage tablets in the tablet library 214. As such, the filters 218 of top layer 210 may be larger in capacity than any of those of the bottom and middle layers in order to hold more key hash-to-tablet index mappings. Because the filters increase, from the bottom to the top layers, in the number of storage tablets 202 to which they index, a larger filter (e.g., a filter from a middle layer or top layer) may represent a longer period of time over which user data was received and hashed than a smaller filter (e.g., a filter from the bottom layer).

In one embodiment, in general, the filter layers may form a cascade of filters, with a first filter of a subsequent filter layer being formed from a combination of the filters from the previous layer. Using FIG. 2 as an example, over time, a first filter 220 of middle layer 208 may be formed from a combination of all the filters 218 of the bottom layer 206, and thus index all the storage tablets previously indexed by the filters of the bottom layer. Likewise, over time, a first filter 222 of top layer 210 may be formed from a combination of all the filters 218 of the middle layer 208, and thus index all the storage tablets previously indexed by the filters of the middle layer. In this manner, the filter layers are filled in a waterfall or cascading manner. Accordingly, in such an embodiment, the filter size of filters in the middle layer 208 may be about M times larger than filters in the bottom layer 206, where M is the number of filters in the bottom layer, and the filter size of filters in the top layer 210 may be about P times larger than filters in the middle layer, where P is the number of filters in the middle layer.

This can be further understood with more specific detail regarding how the filters and various filter layers may be created. Starting with the relatively simpler schematic of FIG. 2, in one embodiment, as noted above, when new user data is received by the system, it is translated into a hash utilizing a hashing algorithm. These new hashes, which include key hashes, are placed into a storage tablet 202. With regard to key hashes, as they are identified, they are additionally sent to the secondary index 204 for inclusion therein. Initially, as the key hashes are received, a bottom layer 206 filter may be created (or reused/recycled if an available bottom layer filter already exists), and the key hash-to-tablet index mappings are stored in the bottom layer filter. Specific construction details of a Bloomier filter (such as for creation of the filters in the bottom, middle, and top layers of the various embodiments of the present disclosure) are described in Bernard Chazelle et al., *The Bloomier Filter: An Efficient Data Structure for Static Support Lookup Tables*, in SODA '04 PROCEEDINGS OF THE FIFTEENTH ANNUAL ACM-SIAM SYMPOSIUM ON DISCRETE ALGORITHMS, 30-39, Jan. 11, 2004, which was previously incorporated by reference herein. When a bottom layer 206 filter is filled up, another bottom layer filter may be created (or reused/recycled if an available bottom layer filter already exists), and the incoming key hash-to-tablet index mappings are stored in the most recently created/reused bottom layer filter. In larger scale versions, this may continue for several more bottom layer filters. In the relatively simpler schematic of FIG. 2, the bottom layer 206 comprises only two filters. When these two filters are filled, or all the filters in the bottom layer 206 are otherwise filled, a middle layer 208 filter may be created (or reused/recycled if an available middle layer filter already exists), and the key hash-to-tablet index mappings of the filters in the bottom layer are stored in the middle layer filter. The existing filters of the bottom layer 206 may be emptied and/or reused for further incoming key hashes. As will be appreciated, the process may repeat again to fill another middle layer 208 filter. Again, in larger scale versions, this may continue for several more middle layer filters. In the relatively simpler schematic of FIG. 2, the middle layer 208 comprises only two filters. When these two filters are filled, or all the filters in the middle layer 208 are otherwise filled, a top layer 210 filter may be created (or reused/recycled if an available top layer filter already exists), and the key hash-to-tablet index mappings of the filters in the middle layer are stored in the top layer filter. The existing filters of the middle layer 208 may be emptied and/or reused for further key hash-to-tablet index mappings from the bottom layer. As will be appreciated, the process may repeat again to fill another top layer 210 filter. Again, in larger scale versions, this may continue for several more top layer filters. In the relatively simpler schematic of FIG. 2, the top layer 210 comprises only two filters. In additional repetitions, in a manner similar to that of the circular log of the tablet library 214, when the top layer 210 is full, the oldest top layer filter is automatically overwritten by the newest incoming key hash-to-tablet index mappings from the middle layer. In this regard, the bottom layer 206 filters generally index the most recent storage tablets 202 in the tablet library 214, while the top layer 210 filters generally index the oldest storage tablets in the tablet library.

Of course, as alluded to in the foregoing, the embodiments of the present disclosure are not limited by the relatively simple schematic of FIG. 2, which is provided only for ease of explanation. In fact, any suitable number of storage tablets 202 could be used for the tablet library 214 and any suitable number of layers and filters 218 per layer may be used for the secondary index 204, as will be appreciated. As an example only, an embodiment could utilize three layers, with the filters in the bottom layer may each index sixty-four (64) storage tablets, the filters in the middle layer may each be filled by the thirty-two (32) bottom layer filters, and thus index 2048 storage tablets, and the filters in the top layer may each be filled by the eight (8) middle layer filters, and thus index 16,384 storage tablets. As such, just as a more practical example, two-hundred fifty-six (256) top layer filters could effectively index 4,194,304 storage tablets. Accordingly, creation may be more generally described as when a layer A of type bottom or middle has been filled, a new layer A+1 filter may be created using the data previously existing in layer A, and the existing layer A filters may be emptied/reused. In the above provided example, for instance, filling of the $32^{nd}$ bottom layer filter triggers the creation (or reuse) of a middle layer filter and the emptying of all bottom layer filters. Likewise, filling of the $8^{th}$ middle layer filter triggers the creation (or reuse) of a top layer filter and the emptying of all middle layer filters. When a new top layer filter is needed, the oldest of the two-hundred fifty-six (256) top layer filters may be emptied/reused. Those skilled in the art will recognize the adaptation of the embodiments of the present disclosure to dictionaries having any suitable number of storage tablets 202 in the tablet library 214 and any suitable number of layers and filters 218 per layer in the secondary index 204.

In one embodiment, a filter construction array 224 may be used to help in the construction of the filters 218 and layers 206, 208, 210 of the secondary index 204. That is, in constructing the filters 218 and layers 206, 208, 210 of the secondary index 204, it may be desirable to have a data structure which contains some or all of the input values for Bloomier filter creation (e.g., f, m, neighbors{1, . . . , k}, tau, next, previous) (see Bernard Chazelle et al., *The Bloomier Filter: An Efficient Data Structure for Static Support Lookup Tables*, in SODA '04 PROCEEDINGS OF THE FIFTEENTH ANNUAL ACM-SIAM SYMPOSIUM ON DISCRETE ALGORITHMS, 30-39, Jan. 11, 2004) for enough key hashes to fill a single top layer filter. That is, the filter construction array 224, in one embodiment, may be sized so as to maintain and hold enough key hashes and associated data for creation of a top layer filter, which also inherently results in the filter construction array being sized to maintain and hold enough key hashes and associated data for creation of the bottom and middle layer filters. In one embodiment, the filter construction array 224 may be a bit-compacted array; of course, any other suitable data structure may be utilized. In some embodiments, the filter construction array 224 may be stored in volatile storage, such as system RAM; however, the filter construction array could be maintained in any suitable type of storage. In one embodiment, the filter construction array 224 may begin empty and may be filled "from the bottom up." In this regard, the filter construction array 224 may supply the construction information for all layers of filters.

More specifically, in one embodiment utilizing a filter construction array 224, as key hashes are identified and sent to the secondary index 204, as described above, the key hashes and associated data may be inserted into the filter construction array starting at index 1. Eventually, enough key hashes will be inserted into or acquired by the filter construction array 224 to create a bottom layer filter, which may be represented, for example, in index entries 1 to LastBL(1) of the filter construction array, where LastBL(x) represents the last entry for bottom layer filter "x." Likewise, eventually, enough key hashes will be inserted into or acquired by the filter construction array 224 to create a second bottom layer filter, which may be represented in index entries LastBL(1)+1 to LastBL(2) of the filter construction array. Again, this process repeats for potentially several bottom layer filters until, eventually, enough key hashes are inserted into or acquired by the filter construction array 224 to create a middle layer filter, which may be represented, for example, in index entries 1 to LastBL(y), where "y" is the number of bottom layer filters. As more hashes are identified and sent to the secondary index 204, the next bottom layer filter may be represented in index entries LastBL(y)+1 to LastBL(y+1), and so on until enough additional bottom layer filters are filled to represent another middle layer filter in the index entries of the filter construction array 224. Eventually, as this process repeats, there will be enough middle layer filters to represent a top layer filter. The top layer filter may be represented, for example, in index entries 1 to LastBL(z), where "z" is the number of bottom layer filters times the number of middle layer filters. In some embodiments, this fills the entire filter construction array 224. After the top layer filter is constructed and the corresponding key hash-to-tablet index mappings are stored therein, the index entries of the filter construction array 224 may be emptied and begin to fill from the bottom up once again. In one embodiment, a single filter construction array 224 may be used, but would block and/or hold further key hash insertions until the new top layer filter was constructed. In other embodiments, two (or more) filter construction arrays could be utilized, for example, in a ping/pong fashion, so that new key hashes can continue to be inserted into one of the filter construction arrays, while the other of the filter construction arrays is in use for creation of the top layer filter.

As a part of Bloomier filter construction, a data structure may be used to track which slots in the filter are only referenced by a single key. Slots in a filter that are only referenced by a single key may be denoted "singleton slots." How this is utilized for Bloomier filter construction is described in Bernard Chazelle et al., *The Bloomier Filter: An Efficient Data Structure for Static Support Lookup Tables*, in SODA '04 PROCEEDINGS OF THE FIFTEENTH ANNUAL ACM-SIAM SYMPOSIUM ON DISCRETE ALGORITHMS, 30-39, Jan. 11, 2004, which was previously incorporated by reference herein. To manage these, in one embodiment, a singleton tracker array 226 may be provided that comprises a 2-bit field for each slot in the filter. In some embodiments, the singleton tracker array 226 may be stored in volatile storage, such as system RAM; however, the singleton tracker array could be maintained in any suitable type of storage. At any rate, the 2-bit field of the singleton tracker array 226 for all slots in a filter may start at the value "0." As neighbor$\{1, \ldots, k\}$ values are calculated for each input key hash, the singleton tracker array 226 field may be incremented for the corresponding slot. Once the field for a slot has been incremented to two (2), in some embodiments, it is not incremented further. The singleton tracker array 226 may thus be utilized in filter construction by indexing all neighbor$\{1, \ldots, k\}$ values to determine which slots hold the value 1, representing a singleton slot. Entries in the filter construction array 224 may be arranged into singleton and non-singleton lists utilizing the "next/previous" values of that array. For the singleton list, a $\tau$ may be assigned for the entry based on which neighbor$\{1, \ldots, k\}$ was the singleton value. The singleton tracker array 226 may be zeroed, and the process may be repeated for the non-singleton list. This may repeat until the non-singleton list is empty. If an iteration occurs where no change occurs in the non-singleton list, some subset of the non-singleton list may be removed and the process repeated. The section that is removed could be added to a secondary in-memory structure or discarded.

Hash Querying and Deduplication

Having described the structure of the data dictionary 200, a method for data deduplication, utilizing the data dictionary will now be described. As described above, when new user data is received by the system, it may be translated into a hash utilizing the hashing algorithm. In one embodiment, prior to storing the new user data to the system and sending the corresponding hash to the data dictionary 200 for storage in a storage tablet 202, the system may first query the tablet cache 216 to check if a matching hash is already maintained in one of the cached storage tablets. As indicated above, in one embodiment, the tablet cache 216 may comprise one or more of the most recently accessed or otherwise utilized storage tablets 202, which can include, for example, storage tablets that were most recently created by the dense storage tablet creation module 212 due to new hash additions as well as storage tablets accessed and brought into RAM memory by hits through the secondary index 204. Of course, other methods for determining which storage tablets 202 are stored in the tablet cache 216 may be utilized. If a hash matching the new hash is found in one of the storage tablets 202 in the tablet cache 216, then in some embodiments, the new user data does not need to be stored and a second reference to the already existing data at the mapped address corresponding to the hash can simply be created. However, for more reliability, if a hash matching the new hash is found in one of the storage tablets 202 in the tablet cache 216, then in other embodiments, if (a) the hash function is a suitably collision-resistant cryptographic hash function (or is otherwise very reliable) and/or (b) a read/compare of the data at the mapped address corresponding to the matching hash against the incoming new user data reveals they are identical, then the new user data does not need to be stored and a second reference to the already existing data at the mapped address corresponding to the hash can simply be created.

If, however, a hash matching the new hash is not found in one of the storage tablets 202 in the tablet cache 216, then in some embodiments, the system may determine if the new hash is identifiable as a key hash. If not, then in some embodiments, the deduplication process may end here, and the new user data may be stored and the new hash may be sent to the dense storage tablet creation module 212, or the data dictionary in general 200, for processing as described above.

If the system determines that the new hash is identifiable as a key hash, then the system may query the secondary index 204 to determine if a hash matching the new hash is represented in one of the filters 218 of the secondary index. Querying the secondary index 204 may be performed by querying the filters 218 of the filter layers 206, 208, 210. Querying of the filters 218 may be performed serially or in parallel, as desired. In some embodiments, the filters may be stored in memory interleaved for enhanced cache performance for efficient querying. If a matching hash value is found represented in more than one filter 218, in one embodiment, the youngest (from the bottom layer to the top layer) and/or most recent filter may be utilized to complete the query. If a hash matching the new hash is found represented in at least one of the filters 218, then in some embodiments, the new user data does not need to be stored and a second reference to the already existing data at the mapped address corresponding to the hash can simply be created. However, for more reliability, if a hash matching the new hash is found represented in at least one of the filters 218, the secondary index 204 may return a storage tablet index for a storage tablet 202 maintained in the tablet library 214. The storage tablet 202 corresponding to the returned tablet index may then be queried for the hash-to-storage mapping data. If (a) the hash function is a suitably collision-resistant cryptographic hash function (or is otherwise very reliable) and/or (b) a read/compare of the data at the mapped address corresponding to the matching hash against the incoming new user data reveals they are identical, then the new user data does not need to be stored and a second reference to the already existing data at the mapped address corresponding to the hash can simply be created. In some embodiments, as indicated above, the storage tablet 202 corresponding to the returned storage tablet index may also be loaded into the tablet cache 216.

In further embodiments, the system may provide multi-controller hash sharing. More specifically, in a multi-controller system, each controller may maintain its own tablets 202, tablet library 214, tablet cache 216, and secondary index 204. Upon receipt by the local data dictionary 200 of a new hash, the local controller may query its own data dictionary and/or one or more of the other controllers for a matching hash. If a matching hash is found on multiple of the controllers, then in some embodiments, the newest version of the hash-to-storage mapping may be used. In one embodiment, this may be determined by examining the time-stamp information stored with each tablet 202. If the most recent version of the matching hash is found to be located at a remote controller's secondary index 204, in some embodiments, the local controller may load into its own tablet cache 216, from the remote controller, the storage tablet 202 corresponding to the matching hash. It may complete this via inter-process communication (IPC) or by accessing the storage tablet 202 directly from the storage device. If new hash matches are found in the storage tablet now cached at the local controller's tablet cache 216, the local controller may insert the new hash-to-storage mappings into its own newest tablet in the dense storage tablet creation module 212. In this manner, hashes can be effectively migrated between controllers based on who has most recently written the data. During a controller failure, ownership of its hashes may automatically migrate, in this manner, to other controllers. During a controller remove, the removed controller's secondary index 204 can be distributed to the remaining controllers by dividing up its storage tablets 202 and filters 218 using a round-robin or other suitable scheme. During a controller add, a subset of each remote controller's secondary index 204 can be inserted into the newly added controller's secondary index.

The various embodiments of the present disclosure are advantageous for a variety of reasons. For example, as noted above, conventional deduplication procedures are often RAM limited. That is, the larger the number of hash-to-storage mappings, the more RAM that must be devoted to the dictionary. However, RAM is relatively very expensive. In contrast, because of the structure of the data dictionary, with dense storage tablets being stored in non-volatile memory, and through use of a secondary index maintained in RAM, the various embodiments of the present disclosure provide a substantial increase over conventional deduplication procedures in terms of the number of hashes that can be stored per byte of RAM. Increasing the density of information stored in RAM, via the secondary index, provides a competitive advantage by permitting greater deduplication capability within the same RAM footprint as conventional deduplication procedures, or alternatively providing the capability to utilize saved RAM space for other purposes.

For another example, most deduplication procedures utilize translation of the user data into a significantly smaller piece of information—the hash. The strength or collision resistance of the hash required has a direct bearing on CPU usage—if a collision-resistant hash is required, more processing resources will be required to generate it, leaving less processing resources for other tasks. The various embodiments of the present disclosure do not require a collision-resistant hash. This decreases the amount of CPU usage needed, allowing utilization of processing resources for other processing tasks, which can increase system IOPS.

In yet another example, generally user writes can be categorized as unique or duplicative. For unique user writes, write performance using deduplication can be highly dependent on being able to determine the unique property as soon as possible because the hash value will not be located in the indexing structure. The various embodiments of the present disclosure provide relatively fast detection of such unique hash values using only RAM-resident information (e.g., the tablet cache 216 and secondary index 204).

In still another example, for non-unique or duplicative user writes, write performance using deduplication, and also the deduplication ratio, can be highly dependent on being able to locate patterns within user data write streams. The various embodiments of the present disclosure help increase performance by co-locating hash-to-storage mappings in the tablet cache 216 and/or by associating hashes with a write stream indicator to correlate specific hashes with a specific write stream. Each permits faster lookup in RAM when a user write pattern is detected, in turn increasing the deduplication ratio. A higher deduplication ratio can act to increase write throughput by not requiring writes of deduplicated data.

In yet another example, a storage system should generally be tolerant of failures. One way of increasing system fault tolerance is by minimizing the amount of metadata which is required to be correct in order to read and write user data without error. In one embodiment, the data dictionary 200 of the present disclosure can take on the role of a semi-trusted advisor. That is, the metadata stored by the data dictionary 200 may be used only to suggest to an external user or host system where duplicative data might already be stored, but the dictionary need not deduplicate or delete any such identified data. Instead, the system may leave it to the external user or host system to verify any results of dictionary queries. In this regard, the dictionary is not a required component of the I/O path with the external host system, and does not detriment read and write correctness, even if its data becomes corrupted or destroyed.

Of course, other advantages of the various embodiments of the present disclosure will be, or become, apparent to those skilled in the art.

In the foregoing description, various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A method for facilitating data deduplication in a data storage system, the method comprising:
maintaining an index comprising a plurality of filters, each filter electronically mapping each of a plurality of hashes to an electronic data library storing a plurality of hash-to-storage mappings;
wherein the plurality of filters are categorized into layers, with a plurality of filters in each layer.

2. The method of claim 1, wherein each of the plurality of hash-to-storage mappings maps a hash value to a storage address location in a data storage subsystem at which a block of data is stored, the block of data translating to the hash value pursuant to a hashing algorithm.

3. The method of claim 1, further comprising maintaining the plurality of filters of the index in random access memory (RAM).

4. The method of claim 3, wherein the electronic data library is maintained in non-volatile memory.

5. The method of claim 3, wherein at least a portion of the electronic data library is maintained as read-only.

6. The method of claim 1, wherein each of the plurality of filters is a Bloomier filter.

7. An information handling system comprising:
a processor; and
a memory accessible to the processor and storing instructions that, when executed by the processor, cause the processor to maintain an index comprising a plurality of filters, each filter electronically mapping each of a plurality of hashes to an electronic data library storing a plurality of hash-to-storage mappings, wherein the plurality of filters are categorized into layers, with a plurality of filters in each layer.

8. The information handling system of claim 7, wherein each of the plurality of hash-to-storage mappings each maps a hash value to a storage address location in the information handling system at which a block of data is stored, the block of data translating to the hash value pursuant to a hashing algorithm.

9. The information handling system of claim 7, wherein the plurality of filters are stored in random access memory (RAM).

10. The information handling system of claim 9, wherein the electronic data library is maintained in non-volatile memory.

11. The information handling system of claim 7, wherein each of the plurality of filters is a Bloomier filter.

12. The information handling system of claim 11, wherein the plurality of hashes mapped by the filters of the index are a pre-defined subset of hashes stored in the electronic data library.

13. The information handling system of claim 7, wherein the layers form a cascade of filter layers with, for each layer above a bottom layer, a filter from that layer is formed from a combination of the filters from a lower layer.

14. The information handling system of claim 7, wherein the electronic data library comprises a plurality of storage tablets, each storage tablet electronically storing a plurality of hash-to-storage mappings.

15. The information handling system of claim 14, further comprising a tablet cache stored in RAM, the tablet cache comprising a subset of storage tablets copied from the electronic data library.

16. The information handling system of claim 15, wherein the tablet cache comprises a storage tablet copied from the data library that has been most recently accessed for a hash-to-storage mapping.

17. A method for data deduplication in a data storage system, the method comprising:
maintaining an index comprising a plurality of filters, each filter electronically mapping each of a plurality of hashes to an electronic data library storing a plurality of hash-to-storage mappings, wherein the plurality of filters are categorized into layers, with a plurality of filters in each layer; and
upon at least one of receipt and determination of a new hash for incoming data, querying the index for a hash-to-storage tablet mapping comprising the new hash.

18. The method of claim 17, wherein the electronic data library comprises a plurality of storage tablets, each storage tablet electronically storing a plurality of hash-to-storage mappings, and the method further comprising:
maintaining a tablet cache comprising a subset of storage tablets copied from the electronic data library; and
upon at least one of receipt and determination of a new hash for incoming data, querying the tablet cache for a hash-to-storage mapping comprising the new hash.

\* \* \* \* \*